UNITED STATES PATENT OFFICE.

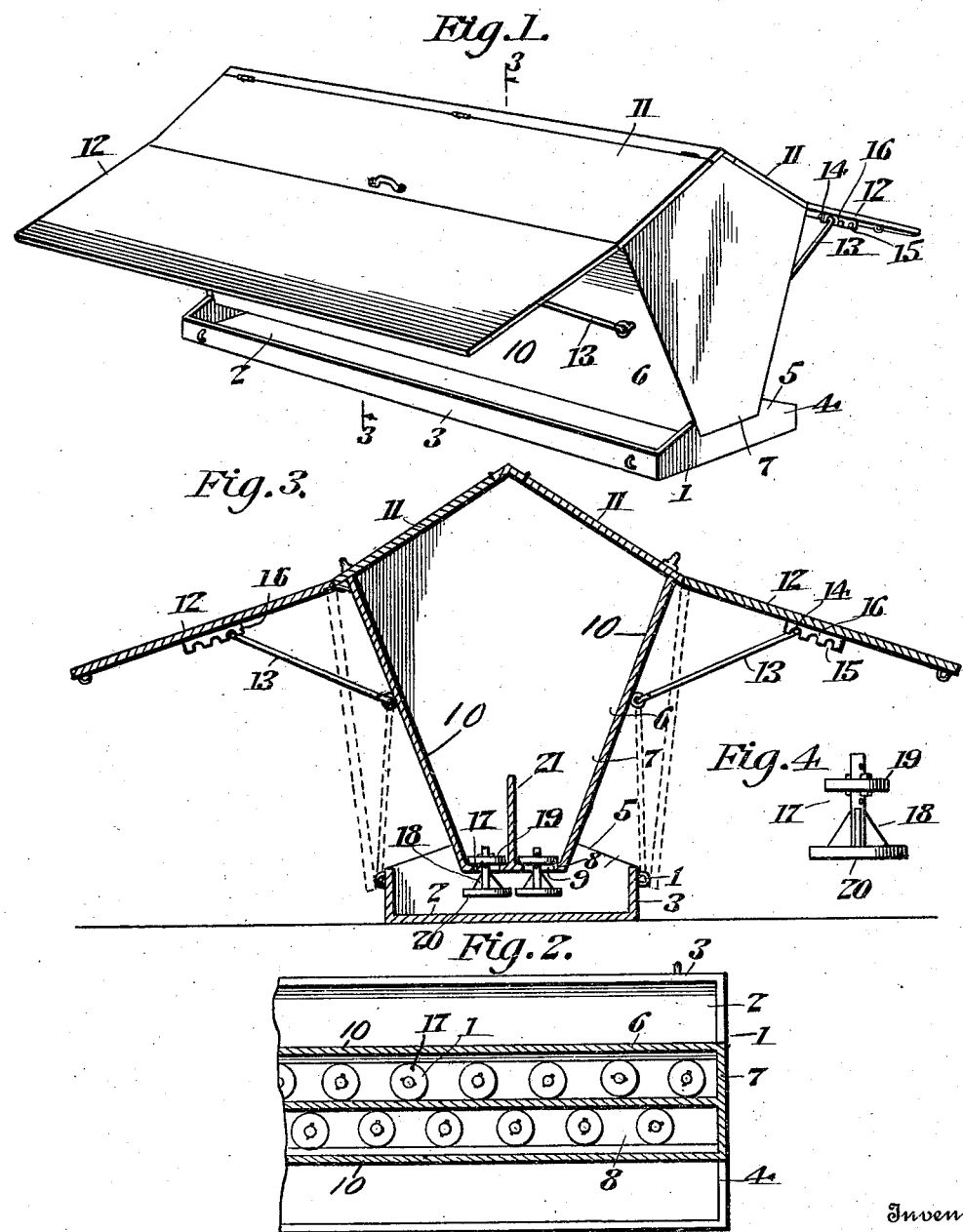

WILLIAM T. HOLLIGAN, OF EMMETT, KANSAS.

STOCK-FEEDING DEVICE.

1,188,274.  Specification of Letters Patent.  Patented June 20, 1916.

Application filed April 20, 1916. Serial No. 92,481.

*To all whom it may concern:*

Be it known that I, WILLIAM T. HOLLIGAN, a citizen of the United States, residing at Emmett, in the county of Pottawatomie and State of Kansas, have invented new and useful Improvements in Stock-Feeding Devices, of which the following is a specification.

This invention relates to a feeding device and more particularly to a device which may be used upon farms to supply food to stock, particularly hogs.

The primary object of the invention is to provide a feeding device in which a bin is provided with valves arranged above a feed trough in such a manner that when the stock are eating therefrom they will operate the valve and enable the supply of food to be automatically replenished within the trough.

Another object of the invention is to provide valves for closing the outlet openings in the bin, which are so constructed that when raised by the animal feeding from the trough only enable a pre-determined quantity of food to escape from the bin, thus preventing the animal from holding the valve in an open position for any length of time.

A still further object of the invention is to provide the bin with hinged extension which may be raised to over-lie the feed trough and protect its contents from the weather, said extensions also serving to shelter the animals feeding from the feed trough included in the device.

With these and other objects in view, the invention resides in the novel combination and arrangement of parts, which will be hereinafter described and particularly pointed out in the claims.

The preferred embodiment of the invention has been illustrated in the accompanying drawing, although no restriction is necessarily made to the precise details of construction therein shown, as changes, alterations, and modifications within the scope of the claims may be resorted to when desired.

Like characters of reference denote corresponding parts throughout the several views in the drawing, in which:

Figure 1 is a perspective view of a feeding device constructed in accordance with the invention. Fig. 2 is a vertical longitudinal section therethrough. Fig. 3 is a vertical transverse section on the line 3—3 of Fig. 1 and showing the hinged extensions on the bin in lowered position in dotted lines. Fig. 4 is a view in elevation of a valve for closing an outlet opening in the bottom of the bin.

Referring now to the drawing in detail, the numeral 1 designates a feed trough having a bottom 2, sides 3, and ends 4, said ends being extended above the sides 3 and recessed to provide supports 5.

A bin 6 extends longitudinally of the feed trough 1 and has its ends 7 secured to the supports 5 above the sides 3 of said feed trough. The bottom 8 of said bin is arranged in horizontal alinement with the upper edge of the sides 3 and is provided with spaced and staggered openings 9 throughout its length. The sides 10 of the bin are inclined upwardly and outwardly from the bottom 8 for the greater portion of the height of the ends 7, so that grain, or the like, which is deposited within the bin is directed by said sides through the openings 8 in the bottom thereof.

The side edges of the ends 7 are inclined toward each other above the sides 10 and co-act with the upper edge of the sides in supporting hinged lids 11 by means of which access may be had to the interior of the bin.

Extensions 12 are hingedly connected with the sides 10 adjacent their upper edge and so arranged with relation to the sides which over-hang and project beyond the sides 3 of the feed trough 1 that when said extensions are in raised position they prevent rain, or the like, from entering the feed trough 1 and also serve to shelter the animals feeding from the trough from the sun.

Props 13 are arranged upon opposite sides of the bin and each has an end pivotally connected with a side 10 thereon, the other end of each prop being bent at an angle to provide an arm 14 engageable with notches 15 in a bracket 16 secured to and adjacent extensions 12, so that the said extension may be supported by the prop at varying angles.

Each opening 9 in the bottom 8 receives a vertically movable valve 17 comprising a winged stem 18, having at one end a head 19 adapted when the valve is in closed position to seat against the upper face of the bottom 8 and at its other end a head 20 adapted when the valve is in open position to seat against the under-face of said bottom.

The heads 19 are longitudinally movable on the winged stems 18, so that the distance between the heads 19 and 20 may be increased or decreased to regulate the quantity of food which escapes from the bin 6 into the feed trough when the valves are operated. The heads 20 are of greater diameter than the heads 19 and serve to deflect the food passing through the openings 8 outwardly toward the sides 3 of the trough, so that the feed is prevented from collecting beneath the heads 20 of the valves and holding the same in open position.

A vertically extending partition 21 extends longitudinally of the interior of the bin 6 and is so arranged that the openings 8 are arranged in longitudinally extending rows upon opposite sides of said partition.

When it is desired to use the feeding device to supply food to cattle and the like, the bin 6 may be filled with grain through the lids 11, the weight of the grain holding the heads 19 of the valves seated against the upper face of the bottom 8 of the bin.

As the stock come to the trough 1 to eat they touch the heads 20 of the valves 17 with their noses and move the winged stems upwardly within the openings 8, such upward movement releasing a small quantity of grain from within the bin 6 into the feed trough 1.

It will be noted with reference to the drawing that when the animal moves one of the valves 17 upwardly, the head 20 will contact with the under-face of the bottom 8 so that the supply of grain through the opening 8 is cut off until the animal allows the valve to again move downwardly, thus preventing the animal from holding the valve in an open position for any length of time to allow the grain within the bin to escape.

From the foregoing description, taken in connection with the accompanying drawing, it is at once apparent that a stock feeding device has been provided which is simple in construction, inexpensive of manufacture, and highly efficient in use.

Having thus described the invention, what is claimed as new, is:

1. A device of the class described comprising a feed trough, a bin supported by the trough and having a bottom spaced from the bottom of the feed trough and provided with rows of spaced openings, valves having heads arranged within the bin above said openings and other heads arranged below said openings, and winged stems mounted to slide in said openings and connecting the heads of the valves.

2. A device of the class described comprising a feed trough, a bin carried by the trough and having a bottom arranged in spaced relation with the bottom of the trough and parallel thereto, said bottom having rows of spaced and longitudinally extending openings therein, valves having heads arranged below said bottom and adapted to serve as deflecting members, winged stems connected with said heads and arranged within said openings, and heads adjustably connected with said stems and arranged above said openings within the bin.

In testimony whereof I affix my signature.

WILLIAM T. HOLLIGAN.

Copies of this patent may be obtained for five cents each, by addressing the "Commissioner of Patents, Washington, D. C."